(12) United States Patent
Tokushima et al.

(10) Patent No.: US 9,971,099 B2
(45) Date of Patent: May 15, 2018

(54) GRATING COUPLER WITH HIGH OPTICAL COUPLING EFFICIENCY FOR SMF

(71) Applicants: NEC CORPORATION, Tokyo (JP); PHOTONICS ELECTRONICS TECHNOLOGY RESEARCH ASSOCIATION, Tokyo (JP)

(72) Inventors: Masatoshi Tokushima, Tokyo (JP); Jun Ushida, Tokyo (JP)

(73) Assignees: NEC CORPORATION, Tokyo (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days. days.

(21) Appl. No.: 15/703,069

(22) Filed: Sep. 13, 2017

(65) Prior Publication Data

US 2018/0074264 A1 Mar. 15, 2018

(30) Foreign Application Priority Data

Sep. 14, 2016 (JP) .................................. 2016-179391

(51) Int. Cl.
G02B 6/34 (2006.01)
G02B 27/09 (2006.01)
G02B 1/11 (2015.01)

(52) U.S. Cl.
CPC .................. *G02B 6/34* (2013.01); *G02B 1/11* (2013.01); *G02B 27/095* (2013.01)

(58) Field of Classification Search
CPC . G02B 6/26; G02B 6/262; G02B 6/35; G02B 6/27; G02B 6/2713; G02B 6/3536
See application file for complete search history.

(56) References Cited

U.S. PATENT DOCUMENTS 4,983,499 A * 1/1991 Suzuki ................. G02B 6/1245
148/DIG. 30
6,191,890 B1 * 2/2001 Baets ................... G02B 5/1809
359/566

OTHER PUBLICATIONS

Masatoshi Tokushima et al., "Anti-phase reflection coating maximizing the directionality of grating couplers," Optics Express, May 16, 2016, pp. 11075-11084, vol. 24, No. 10.
Masatoshi Tokushima et al., "High-Efficiency Folded Shallow-Grating Coupler with Minimal Back Reflection toward Isolator-Free Optical Integration," Proceedings of European Conference on Optical Communication (IEEE, 2015), 3 pgs.
Masatoshi Tokushima et al., "Shallow-grating coupler with optimized anti-reflection coating for high-efficiency optical output into multimode fiber," Applied Physics Express, 2015, 5 pgs., vol. 8, No. 9.

* cited by examiner

*Primary Examiner* — Ryan Lepisto
*Assistant Examiner* — Erin Chiem
(74) *Attorney, Agent, or Firm* — Sughrue Mion, PLLC

(57) ABSTRACT

A grating coupler includes a grating including a core and an anti-phase reflection coating provided on at least one part of the grating. The anti-phase reflection coating includes a high refractive index layer and a buffer layer. The high refractive index layer has at least one selected from a plurality of attributes characterizing the high refractive index layer. The at least one selected attribute gradually deceases along a propagation direction of light in the core of the grating.

11 Claims, 8 Drawing Sheets

GRATING COUPLER WITH HIGH OPTICAL COUPLING EFFICIENCY FOR SMF

This application is based upon and claims the benefit of priority from Japanese patent application No. 2016-179391, filed on Sep. 14, 2016, the disclosure of which is incorporated herein in its entirety by reference.

BACKGROUND OF THE INVENTION

Field of the Invention

This invention relates to a grating coupler and, more particularly, to a grating coupler which is optically coupled to an optical fiber at high efficiency.

Description of Related Art

Optical integrated circuit technology has made a great progress due to the advance of silicon photonics in recent years. Silicon phonics is a technology for forming waveguides and other optical devices that have silicon cores. In order to improve performance and develop into a product, silicon-photonics-based optical chips that include optical integrated circuits have a great advantage in availability of mature and cutting-edge complementary metal oxide semiconductor (CMOS) process technologies. Herein, for simplicity, the optical chips that include the optical integrated circuits are simply called optical chips.

The optical chips manufactured by the silicon photonics are, usually, optically coupled to optical fibers coming from outside of the chips for input/output (I/O) of optical signals, where grating couplers are often formed on the optical chips to couple to the optical fibers. Optical integrated circuits on optical chips process signal light, and grating couplers can emit the signal light nearly vertically to the chip surface, consequently, signal light can be input to optical fibers by butt-coupling the fibers to the grating couplers with beam axes aligned to the fibers. Conversely, by irradiating signal light output from the fibers onto the grating couplers, the signal light can be introduced to the optical chips.

Optical fibers, to which grating couplers are coupled, can be roughly classified into two types. Multi-mode optical fibers (MMFs) are of one type and single-mode optical fibers (SMFs) are of the other type. MMFs have a core diameter of 62.5 µm or 50.0 µm, and SMFs have a core diameter (exactly, a mode diameter) of 9.2 µm, which is smaller than those of MMFs. In order to obtain a sufficient optical coupling efficiency, it is necessary for the precision in aligning an optical fiber and a grating coupler to be one-tenths of the core dimeter or less. Hence, MMFs are sometimes adopted for easier alignment. On the other hand, SMFs exhibit little degradation of optical signals propagating in them, although they require strict alignment. As a result, SMFs are used to transmit optical signals at high bit rates to the distances farther than those for MMFs. Generally, the need of optically coupling grating couplers to SMFs increases, as the bit rate of an optical chip and the transmission distance from it are increased.

A grating coupler changes the propagation direction of a signal light supplied via a waveguide on an optical chip by diffracting the light with its grating. In this event, the signal light is diffracted not only to the upper side of the grating, which is a direction departing from the optical chip, but alto to the lower side of the grating, which is a direction down to the substrate of the optical chip. The light diffracted to the lower side of the grating becomes an optical coupling loss, because it does not enter the optical fiber. For convenience, the ratio of optical energy emitted to the upper side of the grating to that emitted to both upper and lower sides in a unit time is called upward directionality, which is used as a performance indicator of the GC. The optical energy emitted per unit time will be called optical power hereafter, since the units for both values are the same.

There are various grating couplers already known as being efficient in fiber coupling. By way of example, a grating coupler is disclosed in an article which is contributed by M. Tokushima and J. Ushida to Opt. Express 24, 11075-11084 (2016), which has a title of "Anti-phase reflection coating maximizing the directionality of grating couplers," (which will later be called Non-Patent Literature 1). The Non-Patent Literature 1 discloses that there are four operation principles by which the upward directionality of the grating couplers can be increased. More specifically, a first operation principle is that a grating is provided with a reflection mirror on the back, and the reflection mirror reflects light emitted from the back of the grating into the top side. The reflection mirror may be a dielectric multilayer film. A second operation principle is that a grating has deep grooves notched in a thick core layer, and thereby light is efficiently emitted upward due to interference of the light in the core layer. A third operation principle is that an optical chip is provided with an antireflection coating on top, and thereby light, which would otherwise be returned to the substrate, is emitted without reflection at the surface of the optical chip. A fourth operation principle is that a grating is provided with a multilayer anti-phase reflection coating (APRC) on top, by which a part of a light emitted upward is returned to the substrate side and the returned light is superimposed in anti-phase to the light emitted to the back side so as to cancel each other.

Among the above-mentioned four operation principles, the first and the second operation principles have significant effect on increasing the upward directionality but have a disadvantage that they can be applied to limited optical chips. This is because it is difficult to embed the reflection mirror in the substrate and the core layer of the grating must be thick, respectively. The third operation principle has an advantage that the antireflection coating can be easily mounted by depositing it onto the surface, but has a disadvantage that it can little improve the upward directionality.

The last fourth operation principle is a new operation principle which has been found recently. The multilayer of reflection films, which is an APRC, can be easily mounted because it can be deposited on the surface of the substrate, and it has a great effect on improving the upward directionality. Therefore, the fourth operation principle is expected to be applied for a greater upward directionality in case that the other three operation principles are not available or is insufficient. However, applying an ARPC generally reduces the emission efficiency per unit length of the grating, which leads to a large size of optical beam emitted from the grating coupler. As a result, the size of the optical beam can exceed a core diameter or a mode diameter of an optical fiber, when the optical coupling efficiency will be reduced. Accordingly, when the fourth operation principle is applied, it is needed to resolve the size problem of the optical beam emitted.

Regarding to a case where the grating coupler is optically coupled to an MMF the following documents disclose a solution for the problem in using the fourth operation principle. A first article was contributed by M. Tokushima. J. Ushida, T. Uemura. and K. Kurata to Appl. Phys. Express 8(9), 092501 (2015), and it has a title of "Shallow-grating coupler with optimized anti-reflection coating for high-efficiency optical output into multimode fiber," (which will later be called Non-Patent Literature 2). A second article was contributed by M. Tokushima, J. Ushida, T. Uemura, and K. Kurata in Proceeding of European Conference on Optical Communication (IEEE, 2015), P. 2. 20, and it has a title of "High-efficiency folded shallow-grating coupler with minimal back reflection toward isolator-free optical integration," (which will later be called Non-Patent Literature 3). The solution disclosed in these articles is that the grating coupler with a length needed for completely emitting light that is input to the grating coupler is compactly folded under the core of an optical fiber, by which most of the upward emitted light from the grating couple can be irradiated to the core of the fiber. Hereafter, a method of folding the grating coupler is abbreviated to a "folding method" and the grating coupler folded is also called a "folded grating coupler."

The folding methods disclosed in Non-Patent Literatures 2 and 3 are effective means to input the upward emitted light from the grating couple to the inside of the core of the optical fiber. Therefore, the folding methods can be applied to optical coupling of an optical fiber such as an MMF, along which all light is guided as long as it is input to the inside of the core. However, an SMF supports a single mode as an electromagnetic field distribution in a radial direction. Accordingly, when the folding method is used, light coupled to an SMF is limited to a component that has an electric field distribution equal to the mode (specifically, a Gaussian profile) and a phase distribution equal to the mode (specifically, an equiphase). An optical beam emitted from a folded grating coupler does not satisfy those conditions; hence the folded grating coupler cannot be optically coupled to a SMF at a high efficiency.

SUMMARY

It is an objective of the present invention to provide a grating coupler for resolving the above-mentioned problems.

In an aspect of the present invention, there is provided a grating coupler comprising a grating including a core and an anti-phase reflection coating that is provided on at least one part of the grating; the anti-phase reflection coating comprises a high refractive index layer and a buffer layer, wherein the high refractive index layer has one or a plurality of attributes that characterize the high refractive index layer and the at least one attribute gradually deceases along a the propagation direction of light in the core of said grating.

BRIEF DESCRIPTION OF THE DRAWINGS

The above features and advantages of the present invention will be more apparent from the following description of certain preferred embodiments provided in conjunction with the accompanying drawings, in which.

DETAILED DESCRIPTION OF EXAMPLE EMBODIMENTS

The invention will be now described herein with reference to respective example embodiments of configuration of grating couplers thereof in conjunction with the accompanying drawings. Those skilled in the art will recognize that many alternative embodiments can be accomplished using the teachings of the present invention and that the invention is not limited to the embodiments illustrated for explanatory purposes.

First Example Embodiment

A first example embodiment of the present invention is a grating coupler comprising a grating including a core and an anti-phase reflection coating (APRC) provided on at least one part of the grating. The anti-phase reflection coating comprises a high refractive index layer and a buffer layer. The high refractive index layer has one or a plurality of attributes characterizing the high refractive index layer. The at least one attribute gradually deceases along a propagation direction in which light propagates in the core of said grading.

Figure 1:
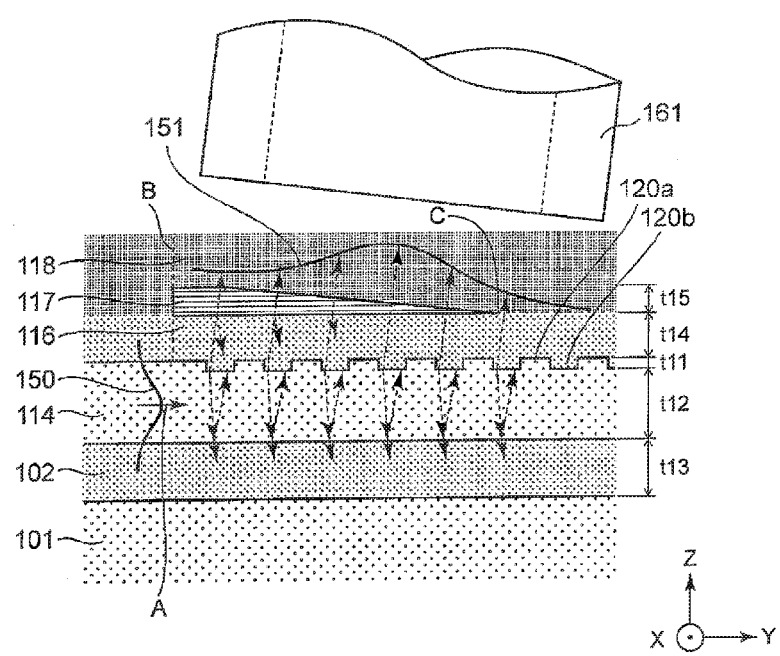
FIG. 1 is a cross-sectional schematic for use in describing a high-efficient grating coupler according to a first example embodiment of this invention, which shows a cross section of the grating coupler with an ARPC and an optical fiber coupled thereto along the longitudinal direction of the grating coupler.

FIG. 1 is a cross-sectional schematic for use in describing a high-efficient grating coupler according to the first example embodiment of this invention, which shows a cross section of the grating coupler with the ARPC and an optical fiber coupled thereto along the longitudinal direction of the grating coupler Herein, as shown in FIG. 1, a Cartesian coordinate system (X,Y,Z) is used. In a state illustrated in FIG. 1, in the Cartesian coordinate system (X,Y,Z), the Z-axis is along the up-and-down direction on the paper (the height direction), in which layers composing the grating coupler are laminated, the X-axis is along the direction normal to the paper (the width direction), which is perpendicular to the Z-axis direction, the Y-axis direction is along the left-and-right direction on the paper (the longitudinal direction), which is perpendicular to the Z-axis direction and the X-axis direction.

Note that the words "up", "down", "left", and "right" may be used to show directions in drawings for convenience in Description of Related Art. The directions described by those words do not necessarily correspond to actual directions decided about the grating coupler used in a practical situation.

The cross-sectional schematic of the grating coupler shown in FIG. 1 illustrates by example a case where the grating coupler is formed to an optical chip using a silicon-on-insulator wafer (SOI wafer) for the sake of specific explanation. The SOI wafer comprises a silicon substrate 101, an embedded oxide film layer 102 formed on the silicon substrate 101, and a silicon layer 114 formed on the embedded oxide film layer 102. As shown in FIG. 1, the embedded oxide film layer 102 has a thickness of t13 while the silicon layer 114 has a thickness of (t12+t11).

Upon forming the grating coupler using the SOI wafer, usually, the silicon layer 114 is used as a core layer for guiding light and the embedded oxide film layer 102 is used as an under cladding. A plurality of grooves 120b is periodically notched to the core layer (the silicon layer) 114. A periodic arrangement of teeth 120a and the grooves 120b constitutes a grating (a diffraction grating). As shown in FIG. 1, the grooves 120b of the grating have a depth oft 11. A grating coupler is often configured so that a silicon oxide film is deposited immediately on the core layer 114 as an upper cladding.

As opposed to this, the grating coupler illustrated in FIG. 1 further comprises an ARPC stacked on the core layer 114. In FIG. 1, the APRC comprises a buffer layer 116 formed on the core layer 114 and a high refractive index layer 117 formed on the buffer layer 116. The buffer layer 116 may comprise a silicon oxide film or the like while the high refractive index layer 117 may comprise a silicon layer or the like. As shown in FIG. 1, the buffer layer 116 has a thickness of t14 while the high refractive index layer 117 has a maximum thickness of t15. An upper cladding 118 is stacked on the high refractive index layer 117. The upper cladding 118 may comprise a silicon oxide film or the like. In FIG. 1, a signal light 151 emitted from the grating coupler is received in a single mode optical fiber (SMF) 161.

In an ARPC in a related art, the high refractive index layer 117 consists of a layer with a uniform thickness. In contrast to this, in the first example embodiment of the present invention, the high refractive index layer 117 has a thickness which becomes thin gradually in a propagation direction in which light 150 propagates within the core layer 114 of the grating (that is, a direction indicated by an arrow A from the left to the right in FIG. 1). Preferably, the high refractive index layer 117 may have, at a left end B thereof, a thickness (which will be called an "optimum thickness") t15 where the upward directionality of the grating coupler has the highest value. Assume, for example, that the high refractive index layer 117 has, at a right end C thereof, a thickness of zero as shown in FIG. 1; then, at the right end C, the buffer layer 116 made of the silicon oxide film and the upper clad 118 come in contact with each other. As a result, it becomes a situation similar to that in which the silicon oxide film is directly stacked on the buffer layer 116 as the upper cladding instead of applying the APRC.

Accordingly, in the vicinity of the left end B, where the high refractive index layer 117 is thick, the upward directionality of the grating coupler is high and it has a significant side effect that the size of emitted beam enlarges. On the other hand, in the vicinity of the right end C, where the high refractive index layer 117 is thin, the upward directionality of the grating coupler is low and it has a small side effect that the size of emitted beam enlarges. The intensity of the light 150, which enters from the left and propagates along the core layer 114, becomes smaller as the light propagates farther along the grating coupler and is gradually emitted from it. It results in increasing the high upward directionality in the former half, where the incident light is still strong, and in suppressing lasting emission in the latter half, where the incident light is already weak. As a consequence, it is possible to realize a high upward directionality of the grating coupler as a whole and an emitted-beam profile having the same size as the mode profile of an SMF.

Figure 2A:
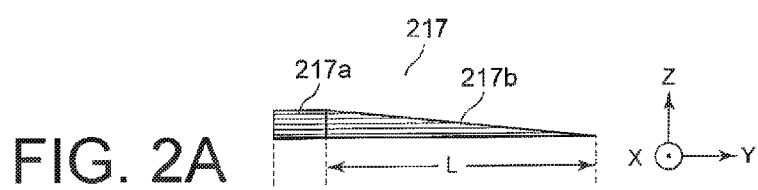
FIG. 2A is a cross-sectional schematic for use in describing an example of the high-efficient grating coupler according to the first example embodiment of this invention, which shows a high refractive index layer of the APRC coated on a grating.
Figure 2B:
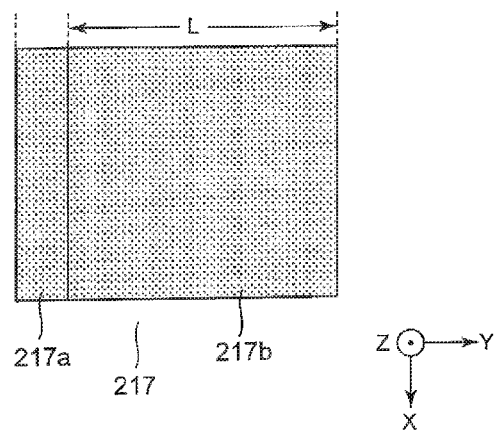
FIG. 2B is a top-view schematic of the high refractive index layer illustrated in FIG. 2A.

FIGS. 2A and 2B are schematics for use in describing an example of the high-efficient grating coupler according to the first example embodiment of this invention. FIG. 2A is a cross-sectional schematic and shows a high refractive index layer 217 of the APRC coated on the grating. FIG. 2B is a top-view schematic of the high refractive index layer 217 illustrated in FIG. 2A.

As shown in FIG. 2A, the high refractive index layer 217 may comprise a constant thickness area 217a and a vertical taper area 217b, in which a thickness decreases gradually. The constant thickness area 217a may preferably start at a position before the grating does, as shown in FIG. 1. By this means, an excess optical loss otherwise caused by scattering at an end of the high refractive index layer 217 can be removed. As shown in FIG. 2B, the high refractive index layer 217 may be a sheet and may be placed so as to cover the grating.

In FIG. 1, assume for example that the embedded oxide film layer 102 has the thickness t13 of 2 µm, the core layer 114 made of silicon has a thickness (t12+t11) of 200 nm, each of the grooves 120b of the grating has a depth t11 of 70 nm. Under this assumption, the optical coupling efficiency of a grating coupler with no APRC coupling to the SMF 161 was calculated to −2.5 dB at a light wavelength of 1.3 µm. An electromagnetic simulation was carried out for the calculation. For another example, assume that the buffer layer 116 has a thickness t14 of 450 nm and the high refractive index layer 117 has a constant thickness t15 of 90 nm, which is the optimum thickness. The optical coupling efficiency for coupling to the SMF 161 deteriorated to −3.4 dB.

As the example of the first example embodiment of the present invention, the above-mentioned high refractive index layer 117 is changed to the high refractive index layer 217 of the vertical taper type, as shown in FIGS. 2A and 2B. In this case, the optical coupling efficiency for coupling to the SMF 161 was improved up to −1.7 dB when the taper length L was 8 µm. For other structural conditions, the thickness t14 of the buffer layer 116 was chosen to be an optimum thickness of about a half of the wavelength of light in the silicon oxide film. In addition, the thickness t15 of the high refractive index layer 217 was chosen to be an optimum thickness of about a quarter of the wavelength of light in the silicon.

The description will be made as regards effects of the first example embodiment.

According to the first example embodiment, it is possible to achieve the high upward directionality due to the APRC (116, 117) and the emitted beam shape equivalent to that of the SMF 161 at the same time even if the back mirror or the thick core layer cannot be incorporated in the optical chip. As a result, it is possible to provide the grating coupler that can be coupled to an SMF at a high optical coupling efficiency.

Accordingly, it is easy to design an optical chip with the high-efficiency grating coupler and it is therefore possible to realize improvement of both performance and productivity of the optical chip at the same time.

Furthermore, it is unnecessary to use a special wafer comprising the back reflector or the thick core layer in order to manufacture the optical chip which can exhibits a high optical coupling efficiency for coupling to an SMF and it is therefore possible to reduce a production cost because a commonly-used wafer is applicable.

Second Example Embodiment

According to the above-mentioned Non-Patent Literature 1, a function of the high refractive index layer of the APRC is to reflect downward a part of light which is scattered and diffracted upward by the grating. The reflectance of the high refractive index layer becomes smaller as the layer becomes increasingly thinner from the optimum thickness. The effect that the reflectance of the high refractive index layer is reduced can be brought by other means.

Figure 3A:
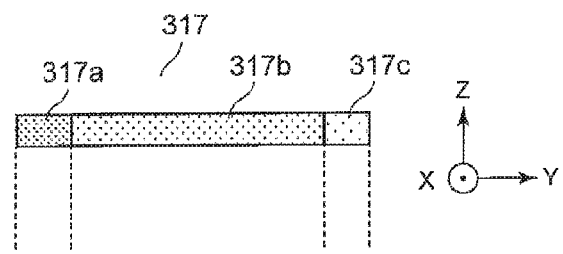
FIG. 3A is a cross-sectional schematic for use in describing an example of a high-efficient grating coupler according to a second example embodiment of this invention, which shows a high refractive index layer of the APRC coated on a grating.
Figure 3B:
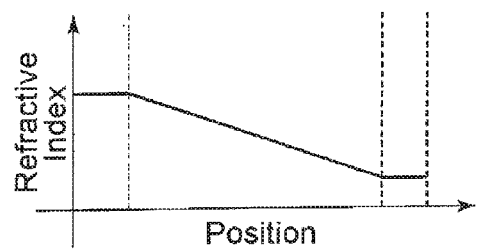
FIG. 3B shows a refractive index distribution of the high refractive index layer illustrated in FIG. 3A.

FIGS. 3A and 3B are schematics for use in describing an example of a high-efficient grating coupler according to a second example embodiment of this invention. FIG. 3A is a cross-sectional schematic and shows a high refractive index layer 317 of the APRC coated on a grating. FIG. 3B shows a refractive index distribution of the high refractive index layer 317 illustrated in FIG. 3A. As shown in FIG. 3A, in the second example embodiment, the high refractive index layer 317 of the ARPC may have a constant thickness t15. Meanwhile, as shown in FIG. 3B, the refractive index averaged in the thickness direction distributes in the longitudinal direction Y thereof in a way that it becomes gradually smaller along the propagation direction of light in the core of the grating (from the left to the right in FIGS. 3A and 3B).

In other words, the second example embodiment comprises a grating coupler which comprises a grating (120a, 129b) including a core 114 (FIG. 1), and an anti-phase reflection coating provided on at least one part of the grating. The anti-phase reflection coating comprises a high refractive index layer 317 and a buffer layer 116 (FIG. 1). The high refractive index layer 317 is made of a material having a refractive index which becomes gradually smaller along the propagation direction in which the light propagates in the core 114 of the grating.

As an example, in order to form the high refractive index layer 317 of a refractive-index-changing type having a constant film thickness, silicon ion implantation into the silicon dioxide film 118 (FIG. 1) was carried out with an injection dose being varied in the longitudinal direction Y from $1 \times 10^{23}/cm^3$ to $1 \times 10^{20}/cm^3$. According to an electromagnetic simulation, it was found that the SMF-coupling efficiency of a grating coupler coupling formed in this way improved to −1.9 dB from −2.5 dB in related art.

The description will be made as regards effects of the second example embodiment.

According to the second example embodiment, it is possible to achieve the high upward directionality due to the APRC (116, 317) and the emitted-beam shape equivalent to that of the SMF 161 at the same time even if the back mirror or the thick core layer cannot be incorporated in the optical chip. As a result, the grating coupler can be coupled to the SMF 161 at a high optical coupling efficiency.

Accordingly, it is easy to design an optical chip with the high-efficiency grating coupler and it is therefore possible to realize improvement of both performance and productivity of the optical chip at the same time.

Furthermore, it is unnecessary to use a special wafer comprising the back reflector or the thick core layer in order to manufacture the optical chip which can exhibits a high optical coupling efficiency for coupling to an SMF and it is therefore possible to reduce a production cost because a commonly-used wafer is applicable.

Third Example Embodiment

As the first example embodiment, the thickness of the high refractive index layer (117; 217) of the APRC was varied. In addition, as the second example embodiment, the reflective index distribution of the high refractive index layer 317 was varied in the longitudinal direction Y. Even when grating couplers with these measures applied cannot be used, there is another means for achieving an effect equal to or more than those. This is to use a grating coupler comprising a grating including a core and an anti-phase reflection coating on at least one part of the grating, the anti-phase reflection coating comprising a high refractive index layer and a buffer layer, wherein at least one part of the high refractive index layer has a surface density which becomes gradually smaller along the propagation direction of light in which the light propagates in the core of the grating. The description will be made about such a grating coupler as a third example embodiment of the present invention.

Figure 4A:
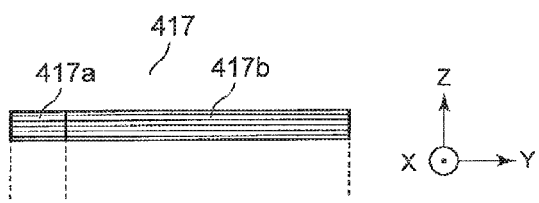
FIG. 4A is a cross-sectional schematic for use in describing a first example of a high-efficient grating coupler according to a third example embodiment of this invention, which shows a high refractive index layer of the APRC coated on a grating.
Figure 4B:
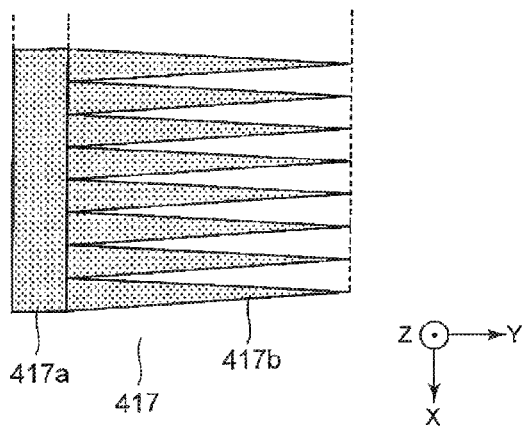
FIG. 4B is a top-view schematic of the high refractive index layer illustrated in FIG. 4A.

FIGS. 4A and 4B are schematics for use in describing a first example of a high-efficient grating coupler according to a third example embodiment of this invention. FIG. 4A is a cross-sectional schematic and shows a high refractive index layer 417 of the APRC coated on a grating. FIG. 4B is a top-view schematic of the high refractive index layer 417 illustrated in FIG. 4A.

As shown in FIG. 4A, the high refractive index layer 417 has a thickness which is constant or substantially constant. As shown in FIG. 4B, the high refractive index layer 417 comprises a continuous body part 417a on the left side and a set of a plurality of taper strips 417b, each of which is gradually narrowing starting from the continuous body part 417a along the propagation direction (from the left to the right in FIG. 4B) in which the light propagates in the core of the grating. The taper strips 417b are arranged periodically or substantially periodically in the width direction X. With this configuration, the surface density of the high refractive index layer 417 decreases toward right from the left in FIG. 4B and the effect of the APRC decreases accordingly. As a result, achieving a high upward directionality of the emitted beam from the grating coupler can be compatible with shaping the beam profile into that of an SMF.

When a sufficient resolution of lithography is unavailable, the gaps of the high refractive index layer 417 in FIG. 4B cannot be defined to be thin enough in the part in which the continuous body part 417a on the left side is just divides into the plurality of taper strips 417. In this case, that part is reduced to be a discontinuous structure, and thereby some of the emitted beam is scattered there as an optical loss.

Figure 5A:
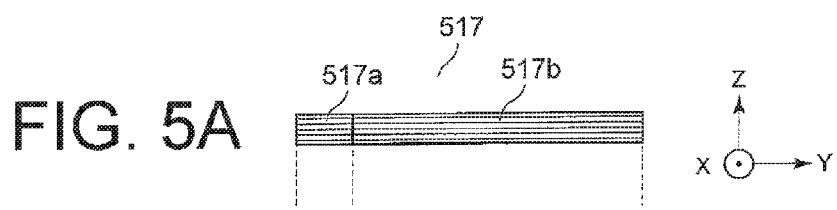
FIG. 5A is a cross-sectional schematic for use in describing a second example of the high-efficient grating coupler according to the third example embodiment of this invention, which shows a high refractive index layer of the APRC coated on a grating.
Figure 5B:
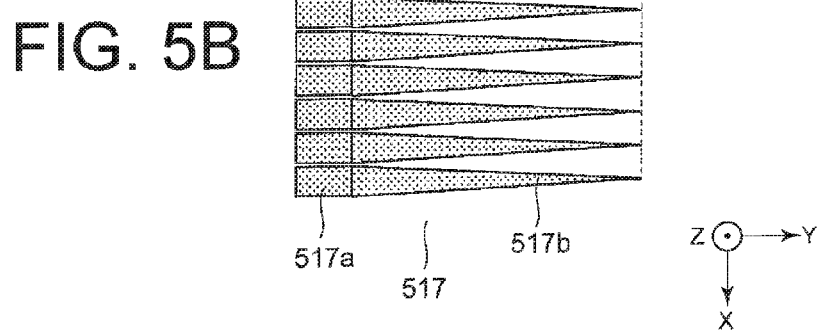
FIG. 5B is a top-view schematic of the high refractive index layer illustrated in FIG. 5A.

In order to avoid such a problem, a high refractive index layer 517 illustrated in FIGS. 5A and 5B may be used.

FIGS. 5A and 5B are schematics for use in describing a second example of a high-efficient grating coupler according to the third example embodiment of this invention. FIG. 5A is a cross-sectional schematic and shows a high refractive index layer 517 of the APRC coated on a grating. FIG. 5B is a top-view schematic of the high refractive index layer 517 illustrated in FIG. 5A.

As shown in FIG. 5A, the high refractive index layer 517 has a thickness which is uniform or substantially uniform in the longitudinal direction Y (the propagation direction in which the light propagates in the core). As shown in FIG. 5B, the high refractive index layer 517 comprises a set of a plurality of intermittent parts 517a, which is already separated in the width direction X at the starting position of grating in the core, and a plurality of taper strips 517b extending from the plurality of intermittent parts 517a on the left side. A combination of each intermittent part 517a and each taper strip 517a constitutes a strip (517a, 517b). Those strips (517a, 527b) are arranged periodically or substantially periodically in the width direction X in a way similar to the first example. Each strip (517a, 527b) may have a taper shape having a width which gradually decreases along the longitudinal direction Y, as shown in FIG. 5B.

As a matter of fact, in cases of the first example and the second example, the upward directionality and the beam profile can be improved to a certain degree by merely adjusting the width of strips without gradually decreasing it, although the flexibility of optimization slightly decreases. In other words, the grating coupler may comprise the high refractive index layer in which one part thereof comprises a set of a plurality of strips each of which extends in the propagation direction in which the light propagates in the core of the grating, and the strips are arranged periodically or substantially periodically.

In any cases, the upward-directionality-enhancing effect of the ARPC is maximized when the period of the periodical structure takes an appropriate value regardless of the width being gradually decreasing in the longitudinal direction Y or being uniform, as long as the strips of the high refractive index layer are arranged periodically or substantially periodically.

Specifically, when it is assumed that $\lambda_0$ represents a wavelength of light in a vacuum and $n_{up}$ represents a refractive index of the upper clad in the high refractive index layer, the strips of the high refractive index layer of a grating coupler may be arranged in a period not more than a value represented by $(\lambda_0/n_{up})(1+1/8)$. More accurately, when the arrangement period of the strips of the refractive index layer is not more than a value represented by $\lambda_0/n_{up}$, the upward-directionality-enhancing effect of the ARPC is maximized and also the efficiency for coupling the grating coupler to an SMF can be easily optimized. However, deterioration of the optical coupling characteristic is small even when the arrangement period is increased up to $(\lambda_0/n_{up})(1+1/8)$.

As described above, the arrangement period of the strips of the high refractive index layer can be any value in the range from $\lambda_0/n_{up}$ to $(\lambda_0/n_{up})(1+1/8)$. Therefore, the surface density of the high refractive index layer can be reduced by expanding the space instead of decreasing the width of each strip in the longitudinal direction Y. In other words, the space of the plurality of strips of the high refractive index layer of a grating coupler may gradually expand in the propagation direction of light in the core of the grating.

Figure 6A:
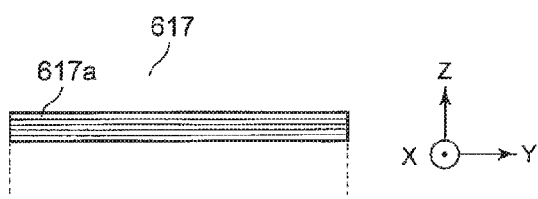
FIG. 6A is a cross-sectional schematic for use in describing a third example of the high-efficient grating coupler according to the third example embodiment of this invention, which shows a high refractive index layer of the APRC coated on a grating.
Figure 6B:
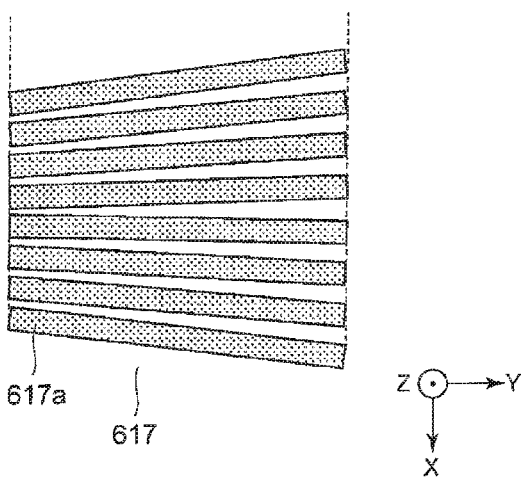
FIG. 6B is a top-view schematic of the high refractive index layer illustrated in FIG. 6A.

Referring now to FIGS. 6A and 6B, this situation will be described in detail. FIGS. 6A and 6B are schematics for use in describing a third example of a high-efficient grating coupler according to the third example embodiment of this invention. FIG. 6A is a cross-sectional schematic and shows a high refractive index layer 617 of the APRC coated on a grating. FIG. 6B is a top-view schematic of the high refractive index layer 617 illustrated in FIG. 6A.

As shown in FIG. 6A, in the third example, the high refractive index layer 617 of the APRC has a thickness which is constant or substantially constant. In addition, as shown in FIG. 6B, the high refractive index layer 617 comprises a set of strips 617a, each of which has a constant width. When light is input from the left to the right along the core of the grating in FIGS. 6A and 6B, the space of the set of the strips 617a (i.e. the high refractive index layer 617) is narrow at the left ends of the strips and becomes wider as they go to the right. As a result, the areal density of the high refractive index layer 617 is large on the left side and is small on the right side. The high upward directionality of the high refractive index layer 617 can be retained by patterning the high refractive index layer 617 in a way that the period of the strips in the width direction is not more than $(\lambda_0/n_{up})(1+1/8)$ at the widest on the right side; as a result, it is possible to provide the grating coupler that can be coupled to the SMF 161 (FIG. 1) at a coupling efficiency.

In FIG. 6B, each strip 617a of the high refractive index layer 617 is depicted as being constant in width, but it may be a taper with a thin tip as a combination of the third example and the above-mentioned second example.

Using FIGS. 4A, 4B, 5A, 5B, 6A, and 6B, the description has been made so far about the grating coupler for which the longitudinal direction of each strip composing a part of the high refractive index layer is parallel or substantially parallel with the propagation direction of light in the core of the grating (i.e. periodicity is perpendicular or substantially perpendicular to the propagation direction of the light); however, the direction of strips is not limited to that. In other words, the longitudinal direction of strips composing a part of the high refractive index layer may be perpendicular or substantially perpendicular to the propagation direction of light in in the core of the grating (i.e. periodicity is parallel or substantially parallel with the propagation direction of the light).

Figure 7A:
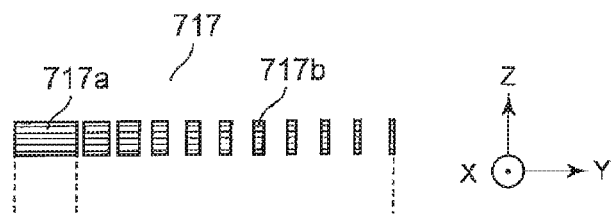
FIG. 7A is a cross-sectional schematic for use in describing a fourth example of the high-efficient grating coupler according to the third example embodiment of this invention, which shows a high refractive index layer of the APRC coated on a grating.
Figure 7B:
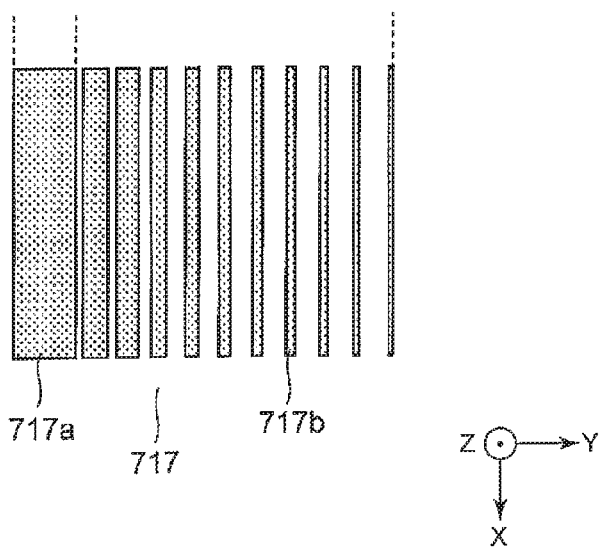
FIG. 7B is a top-view schematic of the high refractive index layer illustrated in FIG. 7A.

FIGS. 7A and 7B are schematics for use in describing a fourth example of a high-efficient grating coupler according to the third example embodiment of this invention. FIG. 7A is a cross-sectional schematic and shows a high refractive index layer 717 of the APRC coated on a grating. FIG. 7B is a top-view schematic of the high refractive index layer 717 illustrated in FIG. 7A. In FIGS. 7A and 7B, the propagation direction of light in the core of the grating is a direction from the left to the right.

The high refractive index layer 717 comprises a continuous body part 717a on the left side and a plurality of strips 717b, each of which has a different width in the manner described hereunder.

As shown in FIG. 7A, the high refractive index layer 717 has a thickness which is constant or substantially constant. The strips 717b are the widest at the leftmost in FIG. 7A and are increasingly narrower at positions closer to the rightmost. This situation is illustrated in FIG. 3B, in which the width of the respective strips 717b of the high refractive index layer 717 are increasingly narrower as it comes from the continuous body part 717a on the left to the right (in the propagation direction in which the light propagates in the core of the grating).

Although in FIG. 7B each strip 717b of the high refractive index layer 717 is depicted as a straight line shape which extends in the width direction X, each strip 717b may have a curved line shape including an arc of a circle so as to fit the wave front of the light which propagates in the core of the grating.

A condition that can be applied to the period and the space of each strip is similar to that of a case where the longitudinal direction of each strip is parallel or substantially parallel with the propagation direction described above is satisfied. Specifically, when it is assumed that $\lambda_0$ represents a wavelength of light in a vacuum and $n_{up}$ represents a refractive index of the upper cladding in the high refractive index layer, the strips of the high refractive index layer of a grating coupler may be arranged in a period not more than a value represented by $(\lambda_0/n_{up})(1+1/8)$. More accurately, when the arrangement period of the strips of the reflective index layer is not more than a value represented by $\lambda_0/n_{up}$, the upward directionality of the ARPC is maximized and also the efficiency for coupling the grating coupler to an SMF can be easily optimized. However, deterioration of the optical coupling characteristic is small even when the arrangement period is increased to $(\lambda_0/n_{up})(1+1/8)$.

Since the periodic structure of the high refractive index layer can be perpendicular to or parallel with the propagation direction of light in the core of the grating, they may be combined.

Figure 8A:
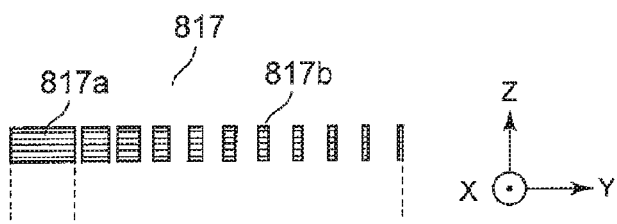
FIG. 8A is a cross-sectional view schematic for use in describing a fifth example of the high-efficient grating coupler according to the third example embodiment of this invention, which shows a high refractive index layer of the APRC coated on a grating.
Figure 8B:
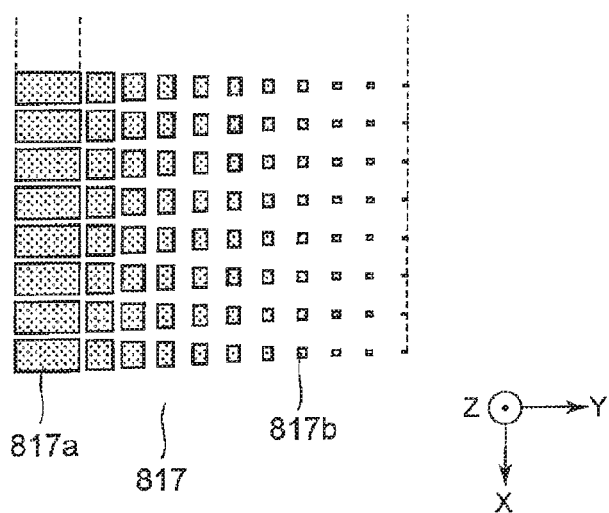
FIG. 8B is a top-view schematic of the high refractive index layer illustrated in FIG. 8A.

FIGS. 8A and 8B are schematics for use in describing a fifth example of a high-efficient grating coupler according to the third example embodiment of this invention. FIG. 8A is a cross-sectional schematic and shows a high refractive index layer 817 of the APRC coated on a grating. FIG. 8B is a top-view schematic of the high refractive index layer 817 illustrated in FIG. 8A.

As shown in FIG. 8A, the high refractive index layer 817 has a constant thickness. In addition, as shown in FIG. 8B, the high refractive index layer 817 composing the ARPC of the grating coupler according to the fifth example comprises a plurality of intermittent parts 817a and a set of a plurality of islands 817b wherein the islands 817b are arranged periodically or substantially periodically. Furthermore, the islands 817b of the high refractive index layer 817 are increasingly narrower in the directions of at least back-and-forth and left-and-right as it comes farther from the input end of the grating in the propagation direction of light in the core of the grating.

In regard to a period of the islands 817b of the high refractive index layer 817, when it is assumed that $\lambda_0$ represents a wavelength of light in a vacuum and $n_{up}$ represents a refractive index of the upper clad in the high refractive index layer 817, the islands 817b of the high refractive index layer 817 may be arranged in both back-and-forth and of left-and-right periods not more than a value represented by $(\lambda_0/n_{up})(1+1/8)$.

Since the arrangement periods can vary within a certain tolerance, the period may be varied instead of varying the widths of the islands 817b in accordance with a position. In other words, the spaces between the islands of the high refractive index layer composing the ARPC of the grating coupler according to the fifth example may be increasingly narrower in the directions of at least back-and-forth and left-and-right as it comes farther from the input end of the grating in the propagation direction of light in the core of the grating.

The description will be made as regards effects of the third example embodiment.

According to the third example embodiment, the upward-directionality-enhancing effect of the APRC and the emitted-beam shape equivalent to the SMF 161 can be achieved at the same time even when the back mirror or the thick core layer cannot be incorporated in the optical chip. As a result, it is possible to provide the grating coupler that can be couple to the SMF 161 at a high efficiency.

Accordingly, it is easy to design the optical chip which can be coupled to an SMF at a high optical coupling efficiency and it is therefore possible to improve both performance and productivity of the optical chip at the same time.

Furthermore, it is unnecessary to use a special wafer comprising the back reflector or the thick core layer in order to manufacture the optical chip for which a high optical coupling efficiency for coupling to an SMF is achieve and it is therefore possible to reduce the production cost of the chip because a commonly-used wafer is applicable.

While the invention has been particularly shown and described with reference to example embodiments thereof, the invention is not limited to these embodiments. It will be understood by those of ordinary skilled in the art that various changes in form and details may be made therein without departing from the sprit and scope of the present invention as defined by the claims.

For example, although the description has been exemplified in cases of selecting, among a plurality of attributes characterizing the high refractive index layer, one of a thickness of the high refractive index layer, a refractive index of a material of the high refractive index layer, and an areal density of the high refractive index layer, the number of a selected attribute is not to limited to one. Accordingly, the grating coupler may be configured so that at least two selected from the plurality of attributes (the thickness of the high refractive index layer, the refractive index of the material of the high refractive index layer, and the surface density of the high refractive index layer) gradually decease along the propagation direction of light in the core of the grating. In addition, the attribute characterizing the high refractive index layer is not limited to the above-mentioned thickness of the high refractive index layer, the above-mentioned refractive index of the material of the high refractive index layer, and the above-mentioned areal density of the high refractive index layer, the attribute may be another attribute excepting them.

What is claimed is:

1. A grating coupler, comprising:
   a grating including a core; and
   an anti-phase reflection coating provided on at least one part of the grating, the anti-phase reflection coating comprising a high refractive index layer and a buffer layer;
   wherein the high refractive index layer has at least one selected from a plurality of attributes characterizing the high refractive index layer, the at least one attribute gradually decreases along a propagation direction in which lights propagates in the core of said grating;
   wherein said plurality of attributes include a thickness of the high refractive index layer, a refractive index of a material of the high refractive index layer, and a surface density of the high refractive index layer;

wherein the surface density in at least one part of said high refractive index layer becomes gradually smaller along the propagation direction.

2. The grating coupler as claimed in claim 1, wherein the thickness of said high refractive index layer becomes gradually thin along the propagation direction.

3. The grating coupler as claimed in claim 1, wherein the refractive index of the material of said high refractive index layer becomes gradually smaller along the propagation direction.

4. The grating coupler as claimed in claim 1, wherein the at least one part of said high refractive index layer comprises a set of a plurality of strips each of which extends in the propagation direction,
wherein the strips are arranged periodically or substantially periodically.

5. The grating coupler as claimed in claim 4, wherein the plurality of strips of said high refractive index layer has a width which becomes gradually narrower along the propagation direction.

6. The grating coupler as claimed in claim 4, wherein the plurality of strips of said high refractive index layer has a space which becomes gradually wider in the propagation direction.

7. The grating coupler as claimed in claim 4, when the light has a wavelength $\lambda_0$ in a vacuum and said high refractive index layer includes an upper clad having a refractive index of $n_{up}$, the strips of said high reflective index layer have an arrangement period in a width direction that is not more than a value represented by $(\lambda_0/n_{up})(1+1/8)$.

8. The grating coupler as claimed in claim 1, wherein the at least one part of said high refractive index layer comprises a set of a plurality of islands,
wherein the islands are arranged periodically or substantially periodically.

9. The grating coupler as claimed in claim 8, where the plurality of islands of said high refractive index layer has at least one of a fore-and-aft width and a left-and-right width that becomes gradually narrower in the propagation direction.

10. The grating coupler as claimed in claim 8, where the plurality of islands of said high refractive index layer has at least one of a fore-and-aft space and a left-and-right space that becomes gradually wider in the propagation direction.

11. The grating coupler as claimed in claim 8, when the light has a wavelength $\lambda_0$ in a vacuum and said high refractive index layer includes an upper clad having a refractive index of $n_{up}$, the islands of said high reflective index layer have a fore-and-aft arrangement period and a left-and-right arrangement period both of which are not more than a value represented by $(\lambda_0/n_{up})(1+1/8)$.

* * * * *

UNITED STATES PATENT AND TRADEMARK OFFICE
CERTIFICATE OF CORRECTION

PATENT NO.         : 9,971,099 B2
APPLICATION NO.    : 15/703069
DATED              : May 15, 2018
INVENTOR(S)        : Masatoshi Tokushima et al.

Page 1 of 1

It is certified that error appears in the above-identified patent and that said Letters Patent is hereby corrected as shown below:

On the Title Page

Column 1, (*) Notice, Line 3; "days. days." has been replaced with --days.-- therefor In the Specification Column 3, Brief Description of Drawings, Line 65; "grating:" has been replaced with --grating;-- therefor Column 4, Brief Description of Drawings, Line 5; "grating:" has been replaced with --grating;-- therefor Column 4, Brief Description of Drawings, Line 33; "grating:" has been replaced with --grating;-- therefor Column 5, Detailed Description of Example Embodiments, Line 40; "oft 11." has been replaced with --of t11.-- therefor Signed and Sealed this
Twenty-ninth Day of January, 2019

Andrei Iancu
*Director of the United States Patent and Trademark Office*